A. CARLSON.
FOLDING SEAT.
APPLICATION FILED JAN. 15, 1919.
1,321,009.
Patented Nov. 4, 1919.
3 SHEETS—SHEET 1.
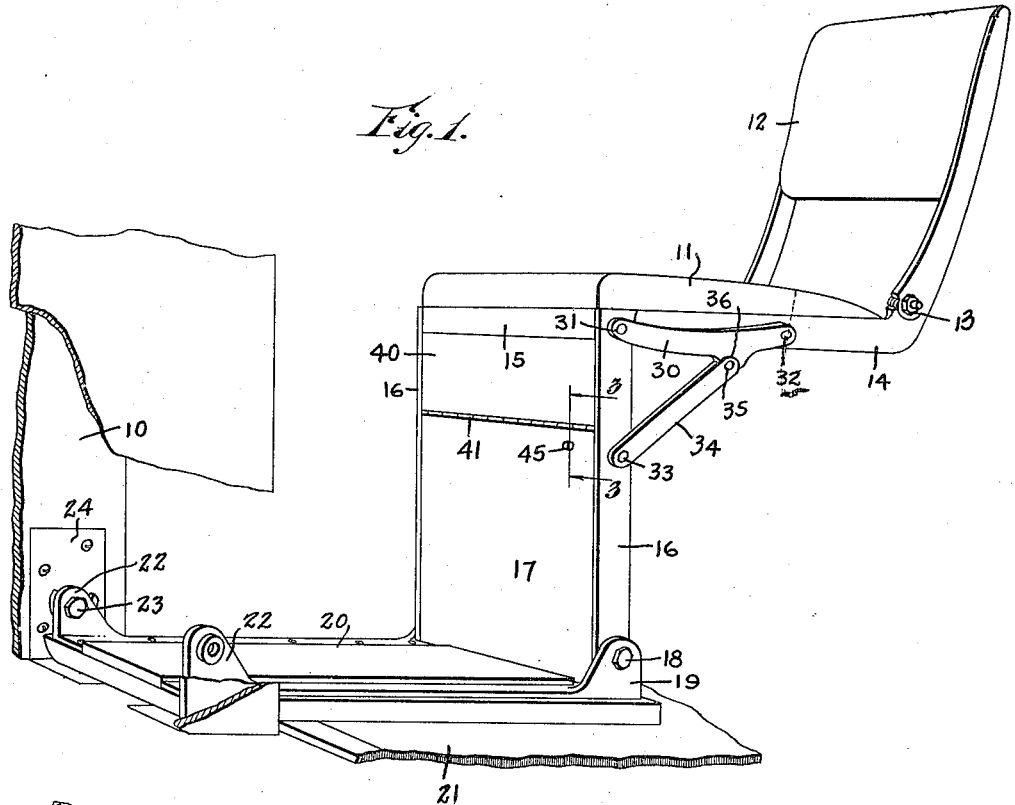
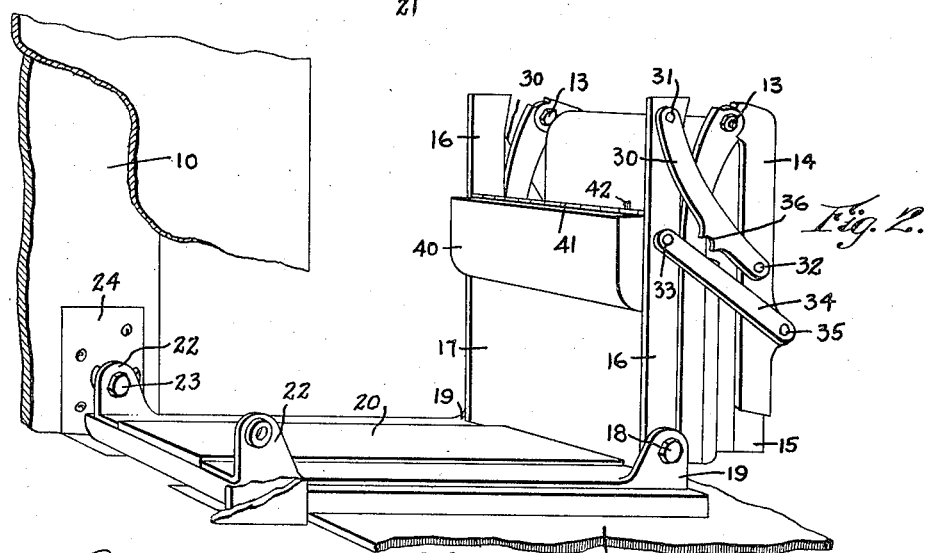
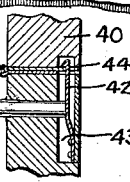
WITNESSES
INVENTOR
Alexander Carlson,
BY
ATTORNEYS

A. CARLSON.
FOLDING SEAT.
APPLICATION FILED JAN. 15, 1919.

1,321,009.

Patented Nov. 4, 1919.
3 SHEETS—SHEET 2.

WITNESSES

INVENTOR
Alexander Carlson,
BY
ATTORNEYS

A. CARLSON.
FOLDING SEAT.
APPLICATION FILED JAN. 15, 1919.
1,321,009.
Patented Nov. 4, 1919.
3 SHEETS—SHEET 3.
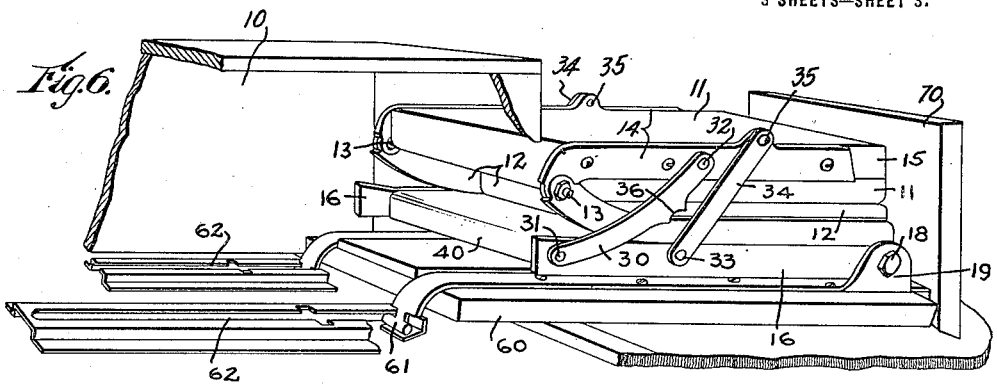
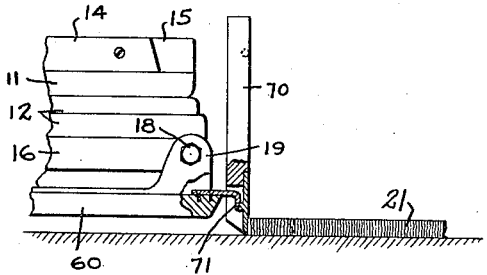
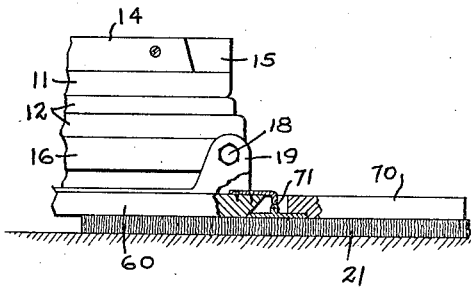
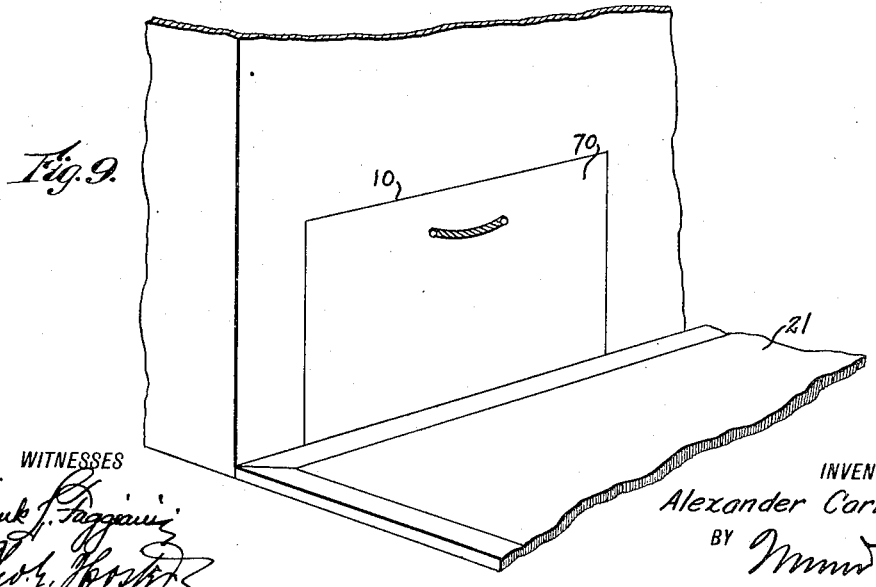
WITNESSES
INVENTOR
Alexander Carlson,
BY
ATTORNEYS

UNITED STATES PATENT OFFICE.

ALEXANDER CARLSON, OF NEW YORK, N. Y.

FOLDING SEAT.

1,321,009. Specification of Letters Patent. Patented Nov. 4, 1919.

Application filed January 15, 1919. Serial No. 271,233.

*To all whom it may concern:*

Be it known that I, ALEXANDER CARLSON, a citizen of the United States, and a resident of the city of New York, South Jamaica, borough of Queens, in the county of Queens and State of New York, have invented a new and Improved Folding Seat, of which the following is a full, clear, and exact description.

The object of the invention is to provide a new and improved folding seat more especially designed as an auxiliary seat for automobiles and other vehicles and arranged for convenient extension to support a person facing forward and without interfering with the occupants of the rear seat. Another object is to permit of readily collapsing, folding and concealing the auxiliary seat in a storage chamber formed in the front seat thus assuring easy ingress and egress.

With these and other objects in view the invention consists of certain novel features of construction as hereinafter shown and described and then specifically pointed out in the claims.

A practical embodiment of the invention is represented in the accompanying drawings forming a part of this specification, in which similar characters of reference indicate corresponding parts in all the views.

Figure 1 is a perspective view of the folding seat as applied and shown in extended position, parts of the vehicle body being shown in section;

Fig. 2 is a similar view of the same partly folded;

Fig. 3 is an enlarged sectional side elevation of the locking device for the auxiliary seat, the section being on the line 3—3 of Fig. 1;

Fig. 6 is a perspective view of a modified form of the folding seat as applied and with parts of the vehicle body shown in section;

Fig. 7 is a side elevation of a portion of the same in folded position and with parts shown in section;

Fig. 8 is a similar view of the same with parts in section and drawn out of the storage chamber; and Fig. 9 is a sectional perspective view of part of the vehicle body with the auxiliary seat shown in Figs. 6, 7 and 8 in concealed position in the storage chamber.

Figure 5:
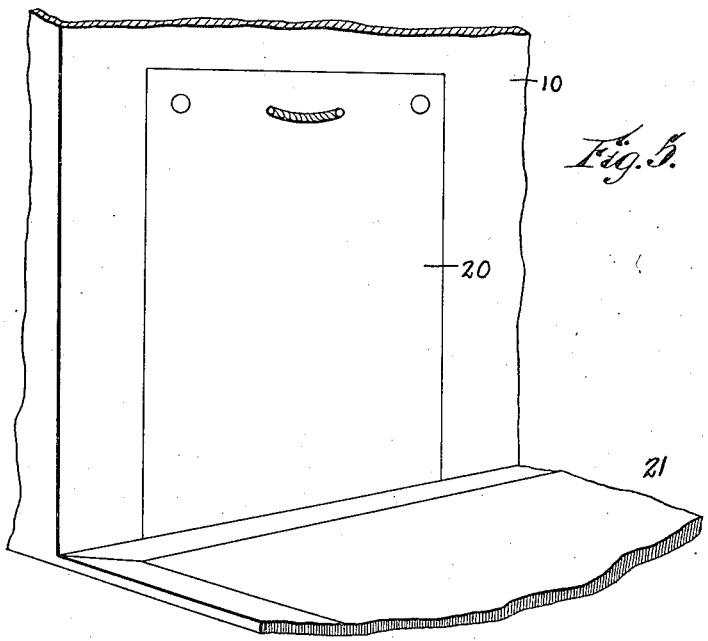
Fig. 5 is a sectional perspective view of a portion of the vehicle body with the folding seat in final folded and concealed position.

The automobile or other vehicle is provided with a storage chamber 10 for an auxiliary seat 11 and preferably formed in the rear of the front seat of the automobile. The folding seat 11 is provided at its rear end with a back 12 preferably pivoted at 13 to side bars 14 of the auxiliary seat 11 to allow of folding the said back 12 upon the auxiliary seat 11. The forward end 15 of the auxiliary seat 11 fits between the upper ends of standards 16 of an upright 17. The lower ends of the standards 16 are connected by pivots 18 with lugs 19 rising from the rear end of a base 20 adapted to rest on the usual carpet 21 on the floor of the vehicle body, and the said base 20 is provided at its forward end with lugs 22 engaging pivots 23 held on plates 24 screwed or otherwise secured to the sides of the storage chamber 10. The storage chamber 10 is open at the back and the base 20 when swung upward into vertical position closes the opening of the storage chamber 10, that is, the base 20 fits into the opening flush with the rear face of the front seat, as plainly indicated in Fig. 5.

Each standard 16 is pivotally connected at its upper end by a link 30 with the corresponding side bar 14 of the auxiliary seat 11, the pivots 31 and 32 of the link 30 being approximately in a horizontal plane at the time the auxiliary seat 11 is in extended position of use, as plainly shown in Fig. 1. Each standard 16 is pivotally connected by a pivot 33 with a brace 34 connected by a pivot 35 with the corresponding side bar 14 of the auxiliary seat 11, the said pivot 33 being located a distance below the pivot 31 and the said pivot 35 being located intermediate the front end 15 of the seat 11 and the pivot 32. The under side of the link 30 is provided with a socket or recess 36 into which fits the upper end of the brace 34 at the time the auxiliary seat 11 is in extended position, as indicated in Fig. 1. It will be noticed that by the arrangement described the links 30 and the braces 34 firmly support the auxiliary seat 11 in extended position rearward of the upright 17 and the base 20, and hence the auxiliary seat does not interfere with the comfort of the occupants of the rear seat.

Figure 4:
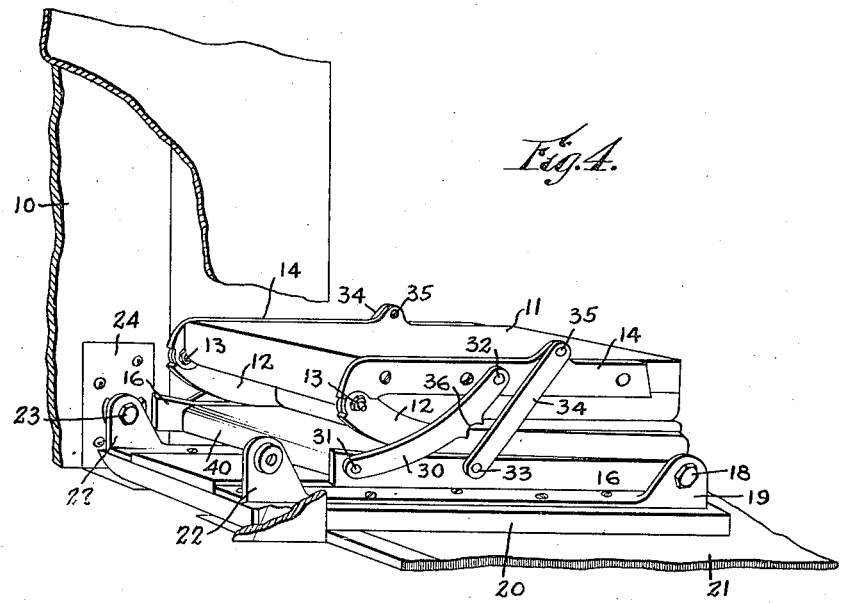
Fig. 4 is a perspective view of the folding seat in completely folded position and prior to being passed into the storage chamber.

In order to lock the auxiliary seat 11 against accidental folding, use is made of a locking piece 40 connected by a hinge 41 with the upper end of the upright 17 a distance below the upper ends of the standards 16. The locking piece 40 when swung upward fits between the standards 16 and against the under side of the forward end 15 of the auxiliary seat 11 thus preventing the seat 11 from being swung upward into folded position. The locking piece 40 is normally locked in upright locking position by the use of a spring catch 42 (see Fig. 3) held in a recess 43 formed in the rear portion of the upright 17, and the spring catch 42 is adapted to engage a keeper 44 held on the underside of the locking piece 40. A push button or a pin 45 is mounted to slide in the upright 17 and is adapted to engage the spring catch 42 to move the latter out of engagement with the keeper 44 whenever it is desired to swing the locking piece 40 forward and downward into unlocking position, as indicated in Fig. 2. It will be noticed that when the locking piece 40 is in this position the auxiliary seat 11 can be readily turned on the pivot 32 as the fulcrum and in doing so the brace 34 moves out of engagement with the socket 36 of the link 30, as plainly indicated in Fig. 2. The auxiliary seat 11 with the back 12 folded thereon now extends in a vertical position, as indicated in Fig. 2, with the back 12 intermediate the seat 11 and the upright 17. After the several parts have been moved into the position shown in Fig. 2 the locking piece 40 is swung upward back into position between the upper ends of the standards 16. The auxiliary seat 11, its back 12 and the upright 17 can now be swung forward and downward upon the base 20 (see Fig. 4) and then the latter with the parts thereon can be swung upward to close the storage chamber 10 and to conceal the auxiliary seat 11, its back 12 and the upright 17 within the said storage chamber 10 (see Fig. 5).

In case the storage chamber 10 is very low then the base 60 carrying the upright 17, the auxiliary seat 11 and the back 12 are adapted to be moved longitudinally instead of being swung up or down as above explained in reference to the seat shown in Figs. 1, 2, 3, 4 and 5. The base 60 is provided with forwardly extending T-shaped heads 61 engaging longitudinal guideways 62 arranged on the bottom of the vehicle body within the storage chamber 10 to allow of sliding the base 60 and the parts mounted thereon into or out of the storage chamber 10. In order to close the open back of the storage chamber 10 use is made of a door 70 connected by a hinge 71 with the rear end of the base 60 to swing into a vertical position for closing the open back of the storage chamber 10 (see Fig. 7) or for swinging downward into a horizontal position on to the carpet 21 to thus hold the base 60 above the floor and guide the same on to the carpet 21 on drawing the base out of the storage chamber 10, as will be readily understood by reference to Fig. 8. It will be noticed that when the base 60 is within the storage chamber and the door 70 is in closed position the lower edge thereof rests on the floor of the vehicle body adjacent the forward end of the carpet 21, as plainly shown in Figs. 7 and 9.

Having thus described my invention, I claim as new and desire to secure by Letters Patent:—

1. A folding seat for vehicles, comprising a base, an upright pivoted on the said base and adapted to fold thereon, a seat, a link pivotally connecting the said upright with the said seat to allow the seat to swing on the said link, a brace pivotally connecting the said upright with the said seat at a point forward of the pivotal connection of the link with the said seat, and locking means on the upright locking the forward end of the seat to the said upright.

2. A folding seat for vehicles, comprising a base, an upright having a top recess and pivoted on the base to fold thereon, a seat having its front portion adapted to fit into the said recess of the said upright, a locking piece pivoted on the said upright and adapted to extend into the said recess against the said seat, a link pivotally connecting the upright with the said seat, and a brace pivotally connecting the said upright with the said seat.

3. A folding seat for vehicles, comprising a base, an upright having a top recess and pivoted on the base to fold thereon, a seat having its front portion adapted to fit into the said recess of the said upright, a locking piece pivoted on the said upright and adapted to extend into the said recess against the said seat, a link pivotally connecting the upright with the said seat, and a brace pivotally connecting the said upright with the said seat, the said link having a socket adapted to be engaged by the said brace.

4. A folding seat for vehicles, comprising a base, an upright pivoted on the said base and adapted to fold thereon, a seat, a link pivotally connecting the said upright with the said seat to allow the seat to swing on the said link, a brace pivotally connecting the said upright with the said seat at a point forward of the pivotal connection of the link with the said seat, the said upright having a recess into which is adapted to fit the forward end of the said seat, a locking piece pivoted on the said upright and adapted to swing into the said recess against the under side of the forward end of the said seat to lock the latter against swinging movement on the said link, and a catch held on the said upright and adapted to engage the said locking piece to lock the latter in locking position.

5. In combination, a vehicle body provided with a seat storage chamber open at the back, a base pivoted at its forward end on the sides of the said chamber and adapted to be swung upward to close the open back of the storage chamber, an upright pivoted on the rear of the said base and adapted to fold upon the same, the said upright having a recess in the upper portion, a seat having its forward end adapted to fit into the said recess, a link pivotally connecting the said upright with the said seat to fold the latter upon the front of the said upright, a brace pivotally connecting the said upright with the said seat, and locking means mounted on the said upright and adapted to engage the forward end of the said seat to lock the latter in extended position.

ALEXANDER CARLSON.

Copies of this patent may be obtained for five cents each, by addressing the "Commissioner of Patents, Washington, D. C."